3,080,371
PROCESS FOR THE PRODUCTION OF TRIETHYLENE DIAMINE
Georg Spielberger, Leverkusen, and Günter Engemann, Koln-Flittard, Germany, assignors to Farbenfabriken Bayer Aktiengesellschaft, Leverkusen, Germany, a corporation of Germany
No Drawing. Filed Apr. 20, 1961, Ser. No. 104,244
Claims priority, application Germany May 3, 1960
11 Claims. (Cl. 260—268)

The present invention relates to a process for the production of triethylene diamine by a ring closure reaction, using special catalysts.

It is already known that triethylene diamine (1,4-diazabicyclo-(2,2,2)-octane) can be prepared by conducting vapours of N-$\beta$-hydroxyethyl piperazine or N,N'-di-$\beta$-hydroxyethyl piperazine over an aluminium silicate catalyst (T. Ishiguro and collaborators, J. Pharm. Soc. Jap 75 (1955) pages 1370–1373). However, yields of only 20% and 30%, respectively, are obtained by this means.

It is also known to obtain triethylene diamine in yields below 20% by heating the dihydrochloride of N-$\beta$-hydroxyethyl piperazine (O. Hromatka, E. Engel, B. 76 (1943), 712).

A disadvantage of both these processes is the small yield which is obtained. Triethylene diamine is an important industrial product and is used on a large industrial scale as an accelerator in the reaction of isocyanates with compounds containing hydroxyl groups. Consequently, there is an urgent demand for synthesising triethylene diamine in a simplest possible manner.

It is an object of the invention to provide a process for the production of triethylene diamine, using readily available catalysts, so as to obtain triethylene diamine in high yield without any corrosion of the equipment used. Other objects will be apparent from the following description.

It has now been found that triethylene diamine is obtained in good yields and in a simple manner by heating N-$\beta$-hydroxyethyl piperazine or N,N'-di-$\beta$-hydroxyethyl piperazine with a carboxylic acid to temperatures between 250 and 350° C., if desired the operation can be carried out in the presence of a high-boiling point solvent. The diethylene triamine and water formed is distilled off.

It was completely surprising and could not in any way be anticipated that the use of carboxylic acids as catalysts would increase the yield in the ring closure reaction to approximately twice the value. Using the process according to the invention yields of 50% of the theoretical and higher can be produced.

As well as N-$\beta$-hydroxyethyl piperazine and N,N'-di-$\beta$-hydroxyethyl piperazine as starting materials for the process according to the invention, there are also considered mixtures of these two substances, for example the product obtained by adding ethylene oxide to piperazine.

Suitable carboxylic acids are aliphatic fatty acids with 8–16 carbon atoms and aryl fatty acids with the same number of carbon atoms. Dicarboxylic acids with 8–16 carbon atoms are also suitable. The following carboxylic acids can for example be used with particular advantage: lauric acid, palmitic acid, fatty acid mixtures of vegetable oils, such as palm kernel oil, phenoxy acetic acid, phenylbutyric acid, phenylacetic acid, cinnamic acid, suberic acid and naphthenic acids, phthalic acid.

The solvents which may be used must be inert and have a boiling point higher than 250° C. They should moreover not contain any reactive groups. Consequently, hydrocarbons and ethers are more especially to be considered and the following are mentioned individually: aromatic, aliphatic and naphthenic mineral oils, alkylated or aralkylated benzene or naphthalene, more especially diphenyl ether, diphenylene oxide, and benzyl naphthalene. Because of its very high boiling point, benzyl naphthalene is especially suitable.

The reaction temperature is between 230 and 350° C. Without high-boiling solvents and without applying pressure, the starting temperature is limited by the boiling point of the starting material to 245–250° C., but the temperature can be raised during the reaction due to the formation of secondary products of higher boiling point. Especially favourable are temperatures of from 280°–330° C., particularly when working in high-boiling solvents in a relatively highly diluted form.

The reaction is preferably performed at atmospheric pressure, but it is also possible to work under slight superatmospheric pressure up to 10 atm. or a slight vacuum. It is also advisable in certain cases to pass an inert gas through to carry away the triethylene diamine, which is produced, from the region of high temperature.

The process can be carried out intermittently or continuously. Either the carboxylic acid can be initially provided and the hydroxyethyl piperazine can be run thereinto or the acid, dissolved in excess amine, can be added to a reaction mixture which is already provided. Generally speaking, about 1–15% and preferably 5–10% of carboxylic acid, related to the N-$\beta$-hydroxylethyl piperazine or N,N'-di-$\beta$-hydroxyethyl piperazine are used. The upper limit as regards the quantity of carboxylic acid to be added is merely determined from economic points of view. The carboxylic acids can also be used in excess, in which case they simultaneously act as solvent.

Especially when working with solvents of high boiling point, the introduction of the starting material and the extraction of the reaction products can be carried out continuously. It is advisable to work in relatively dilute solutions in order to avoid a spontaneous condensation of N-$\beta$-hydroxyethyl piperazine. The solutions preferably contain 0.1–10%, advantageously 0.5–5%, of initial material. However the concentrations are not in any way critical, for it is also possible to dispense with the solvent.

The reaction temperatures are so high that the water formed in the ring closure and the triethylene diamine distil off. In such a case, with insufficient fractionation of the return flow, starting material can also pass into the crude distillate. The starting material obtained when working up the crude distillate can be returned to the reaction chamber.

The secondary products of high boiling point remain in the reaction vessel itself. They can be removed by extracting a part thereof continuously or intermittently from the sump of the reaction vessel and working it up to pure solvent which can be again returned to the process. This working up can be effected by distillation or extraction, for example with aqueous acid or by other suitable steps.

The crude distillate which is obtained and which consists essentially of water and triethylene diamine is advantageously subjected to a fractional distillation. In this way, pure triethylene diamine is obtained. However, it is also possible to isolate the reaction product by extraction with solvents, such as benzene.

The process according to the invention has various advantages over the prior known processes. High yields are produced with this process, which can easily be conducted without any corrosion. Furthermore, the carboxylic acids used as catalysts are readily obtainable industrially.

Triethylene diamine is used as accelerator in the industrially very important reaction of isocyanates with compounds containing hydroxyl groups, and water.

The invention is further disclosed in the following examples, which are illustrative but not limitative thereof.

Example 1

130 parts by weight of β-hydroxyethyl piperazine are initially heated to 240° C. with 13 parts by weight of lauric acid in a stirrer-type vessel which is equipped with a reflux condenser and a means for drawing off the returning distillate. The temperature of the vessel is slowly raised to 290–300° C. During the first 36 hours, 65 parts by weight of crude distillate are obtained at reflux temperatures of 150–220° C., and this crude distillate is fractionally distilled. 46 parts by weight of a fraction which boils at a temperature below 168° C. at 100 mm. Hg are obtained. The fraction of higher boiling point amounts to 18 parts by weight.

These 18 parts by weight of the fraction of higher boiling point are supplied, together with 46 parts by weight of fresh β-hydroxyethyl piperazine, to the reaction vessel. After another 16 hours, another 58 parts of crude distillate are formed at a reaction temperature of 170–300° C. The reaction residue in the reaction vessel constitutes a crystalline brown wax. It is heated to 280° C. at 100 mm. Hg and 8.6 parts by weight of distillate are thereby obtained. From the first and second crude distillates and also from the residual distillate, a total of 63.2 parts by weight of triethylene diamine are obtained by fractional distillation, this quantity corresponding to 41.7% of the theoretical.

Example 2

660 parts by weight of benzyl naphthalene are heated with 10 parts by weight of lauric acid while stirring to 270–305° C. A pre-heated solution of 13 parts by weight of lauric acid in 130 parts by weight of β-hydroxyethyl piperazine are run in over a period of 36 hours. After some time, the mixture starts to boil. The reflux mixture consisting mainly of triethylene diamine, water and a small quantity of β-hydroxyethyl piperazine is drawn off through a lateral discharge. This crude distillate immediately solidifies in the cold. After completing the very slow dropwise addition, more triethylene diamine is distilled off by passing a weak stream of nitrogen through. By fractionally distilling of the crude distillate, there are obtained 37.5 parts by weight of triethylene diamine (100%) as well as 14 parts by weight of initial material, as distillation residue.

The residue remaining in the reaction vessel consists essentially of benzyl naphthalene and is heated to 310–315° C., that is to say, to a somewhat higher temperature than in the first passage. A solution of 13 parts by weight of lauric acid in 130 parts by weight of β-hydroxyethyl piperazine is added dropwise within 20 hours. Thereafter, the 14 parts by weight of β-hydroxyethyl piperazine are added, this having been obtained as distillation residue in the fractionation of the first crude distillate. A very slow stream of nitrogen assists the distilling off of the reaction products in another 8 hours. 160.6 parts by weight of crude distillate are obtained, from which it is possible to recover 52.6 parts by weight of triethylene diamine (100%) by fractional distillation and 44.5 parts by weight of hydroxyethyl piperazine as residue of the reaction.

After further passages, additional portions, each consisting of 130 parts by weight of β-hydroxyethyl piperazine and 13 parts by weight of lauric acid, are added to the residue in the reaction vessel (consisting substantially of benzyl naphthalene), the addition taking place at 315° C. The following table shows the results of these experiments in which the distillation residue which is obtained with the fractionation of the crude distillate is in each case additionally used in the reaction during the next passage.

| No. | Batch | | | | | Yield | | |
|---|---|---|---|---|---|---|---|---|
| | β-Hydroxyethyl piperazine, pts. by wt. | Residue, pts. by wt. | Lauric acid, pts. | Temperature, °C. | Duration, h. | Crude | Tri-ethylene diamine (100%), pts. by weight | Distillation residue, pts. by weight |
| 1 | 130 | 43 | 13 | 310–315 | 49 | 163 | 41.5 | 69.7 |
| 2 | 130 | 69.7 | 13 | 305–315 | 44 | 173 | 50.6 | 63.7 |
| 3 | 130 | 63.7 | 13 | 315 | 37 | 138 | 55.2 | 28.1 |
| 4 | 130 | 28.1 | 13 | 313–315 | 33 | 160 | 45.9 | 56.6 |
| 5 | 130 | 56.6 | 13 | 315 | 31 | 182 | 30.0 | 81.1 |
| 6 | 130 | 81.1 | 13 | 314 | 21 | 145 | 55.6 | 41.6 |
| 7 | 130 | 41.6 | 13 | 314 | 16 | 150 | 46.5 | 25.9 |

Example 3

236 parts by weight of di-β-hydroxyethyl piperazine are heated with 21 parts by weight of lauric acid for 20 hours to 270–300° C. water and triethylene diamine are split off. These more volatile products are distilled and collected in a receiver. The triethylene diamine can be recovered from this crude distillate by fractional distillation.

Example 4

Using an apparatus according to Example 2, several batches each of 130 parts by weight of β-hydroxyethyl piperazine and 13 parts by weight of lauric acid are slowly added dropwise, and while stirring to 300 parts by weight of benzyl naphthalene, heated to 285–330° C. The water and triethylene diamine which are formed are removed through the reflux condenser. No nitrogen is passed through. The crude distillate thus obtained is distilled by fractionation. Fractions of the crude distillate boiling at a temperature above 210° C. are always returned to the reaction vessel. The results which are obtained will be seen from the following table.

| No. | Batch | | | | | Yield | | |
|---|---|---|---|---|---|---|---|---|
| | β-Hydroxyethyl piperazine, pts. by wt. | Residue, pts. by wt. | Lauric acid, pts. | Temperature, °C. | Duration, h. | Crude | Tri-ethylene diamine (100%), pts. by weight | Distillation residue, pts. by weight |
| 1 | 130 | | 13 | 285–336 | 22 | 110 | 30.9 | 49.8 |
| 2 | 130 | 49.8 | 13 | 300–330 | 22.5 | 159.8 | 63.8 | 43.8 |
| 3 | 130 | 43.8 | 13 | 295–305 | 20 | 117.8 | 52.6 | 30.8 |
| 4 | 130 | 30.8 | 13 | 290–320 | 27 | 122.1 | 58.1 | 14.1 |
| 5 | 130 | 14.1 | 13 | 290–317 | 24 | 146.5 | 73.2 | 23.4 |
| | 650 | | | | | | 278.6 | |

The average yield of triethylene diamine is thus 49.8% of the theoretical.

Example 5

In a manner analogous to Example 2 and using the same apparatus, 600 parts by weight of benzyl naphthalene are heated to 305–310° C. and a mixture of 130 parts by weight of β-hydroxyethyl piperazine and 13 parts by weight of phenoxyacetic acid is added within 16 hours. The distillate is fractionated and the fraction boiling above 210° C. is added to the new batch consisting of 130 parts by weight of β-hydroxyethyl piperazine and 13 parts by weight of phenoxyacetic acid. After 6 operations with the use of a total of 780 parts by weight of β-hydroxyethyl piperazine, 46 parts by weight of β-hydroxyethylpiperazine are recovered from the last distillate, that is to say, 734 parts by weight have reacted. The fractions of low boiling point contain 334.6 parts by weight of triethylene diamine, corresponding to a yield of 53.7% of the theoretical.

Between the experiments, the residual benzyl naphthalene is not purified or distilled.

Example 6

In exactly the same manner as in the preceding example, six operations are carried out with the same quantities, only with the difference that in each case 13 parts by weight of phenylacetic acid are used instead of the phenoxyacetic acid.

With a total batch of 780 parts by weight of β-hydroxyethyl piperazine, 68 parts by weight are finally recovered, and thus 712 parts by weight are consumed.

Thus, 329 parts by weight of triethylene diamine are obtained, corresponding to 53.5% of the theoretical.

Example 7

In the same manner as in Example 1, five batches each with 130 parts by weight of β-hydroxyethyl piperazine and 13 parts by weight of adipic acid are reacted in 600 parts by weight of benzyl naphthalene.

With a consumption of 550 parts by weight of β-hydroxyethyl piperazine, 187 parts by weight of triethylene diamine are obtained.

Example 8

By working in accordance with Example 7 but using 13 parts by weight of phthalic acid anhydride as catalyst in each case instead of 13 parts by weight of adipic acid, 590 parts by weight of β-hydroxyethyl piperazine are consumed after five batches, and 194 parts by weight of triethylene diamine are obtained.

Example 9

Using the same apparatus as in Example 2, 600 parts by weight of a mineral oil of high boiling point are heated to 305–315° C., 50 parts by weight of lauric acid are added and the mixture of 130 parts by weight of β-hydroxyethyl piperazine with 13 parts by weight of lauric acid is added dropwise six times in 12 to 14 hours. The distillate is fractionated each time and the fractions boiling above 210° C. are added to the next quantity.

282 parts by weight of triethylene diamine are formed from 780 parts by weight of β-hydroxyethyl piperazine.

We claim:

1. Process for preparing triethylene diamine, which comprises heating a piperazine selected from the group consisting of N-β-hydroxyethyl piperazine, N,N'-di-β-hydroxyethyl piperazine and mixtures thereof in the presence of an acidic catalyst selected from the group consisting of aliphatic and aromatic mono- and di-carboxylic acids containing from 8–16 carbon atoms to a temperature within the range of 230–350° C., and recovering the triethylene diamine thereby formed.

2. Process according to claim 1, wherein the heating is carried out in the presence of an inert solvent having a boiling point in excess of 250° C.

3. Process according to claim 1, wherein said heating is effected to a temperature within the range of 280–330° C.

4. Process according to claim 1, wherein said acid catalyst is present in an amount of 1–15% of acid referred to said piperazine.

5. Process for preparing triethylene diamine, which comprises heating β-hydroxyethyl piperazine in the presence of lauric acid as catalyst to a temperature of between 290–300° C., and recovering the triethylene diamine thereby formed.

6. Process for preparing triethylene diamine, which comprises heating β-hydroxyethyl piperazine in the presence of lauric acid as catalyst and benzyl naphthalene as inert solvent to a temperature of between 270–305° C., and recovering the triethylene diamine thereby formed.

7. Process of preparing triethylene diamine, which comprises heating di-β-hydroxyethyl piperazine in the presence of lauric acid as catalyst to a temperature of from 270–300° C., and recovering the triethylene diamine thereby formed.

8. Process according to claim 1, in which said acid catalyst is phenoxyacetic acid.

9. Process according to claim 1, in which said acid catalyst is phenylacetic acid.

10. Process according to claim 1, in which said acid catalyst is adipic acid.

11. Process according to claim 1, in which said acid catalyst is phthalic acid.

References Cited in the file of this patent

UNITED STATES PATENTS

| | | |
|---|---|---|
| 2,977,364 | Mascioli | Mar. 28, 1961 |
| 2,985,658 | Krause | May 23, 1961 |

OTHER REFERENCES

Hromatka: Berichte, vol. 76, pages 712–717 (1943).

Bergman: The Chemistry of Acetylene and Related Compounds, page 80, Interscience Publishers Inc., New York (1948).